United States Patent [19]

Bosniack

[11] 4,020,149
[45] Apr. 26, 1977

[54] PROCESS FOR THE PRODUCTION OF SULFUR

[75] Inventor: David S. Bosniack, Baytown, Tex.

[73] Assignee: Exxon Research and Engineering Company, Linden, N.J.

[22] Filed: Mar. 1, 1976

[21] Appl. No.: 662,792

Related U.S. Application Data

[63] Continuation-in-part of Ser. No. 574,182, May 2, 1975, abandoned.

[52] U.S. Cl. .................................. 423/575; 55/73
[51] Int. Cl.² ..................................... C01B 17/04
[58] Field of Search ............... 423/575, 226; 55/56, 55/73

[56] References Cited

UNITED STATES PATENTS 2,001,715  5/1936  Fischer ............................. 260/16
2,881,047  4/1959  Townsend ......................... 423/575
3,923,645  12/1975  Anderson et al. .................. 260/206

FOREIGN PATENTS OR APPLICATIONS 2,719  9/1908  United Kingdom ............... 423/575

OTHER PUBLICATIONS

Albertson et al., "Journal of American Chemical Society," 1943; pp. 1690–1691.

Primary Examiner—G. O. Peters
Attorney, Agent, or Firm—Yale S. Finkle

[57] ABSTRACT

Elemental sulfur is produced by reacting hydrogen sulfide and sulfur dioxide in a solvent reaction medium composed of liquid organic disulfides. The sulfur is separated from the disulfide solvent which may then be reused as the reaction medium.

8 Claims, 1 Drawing Figure

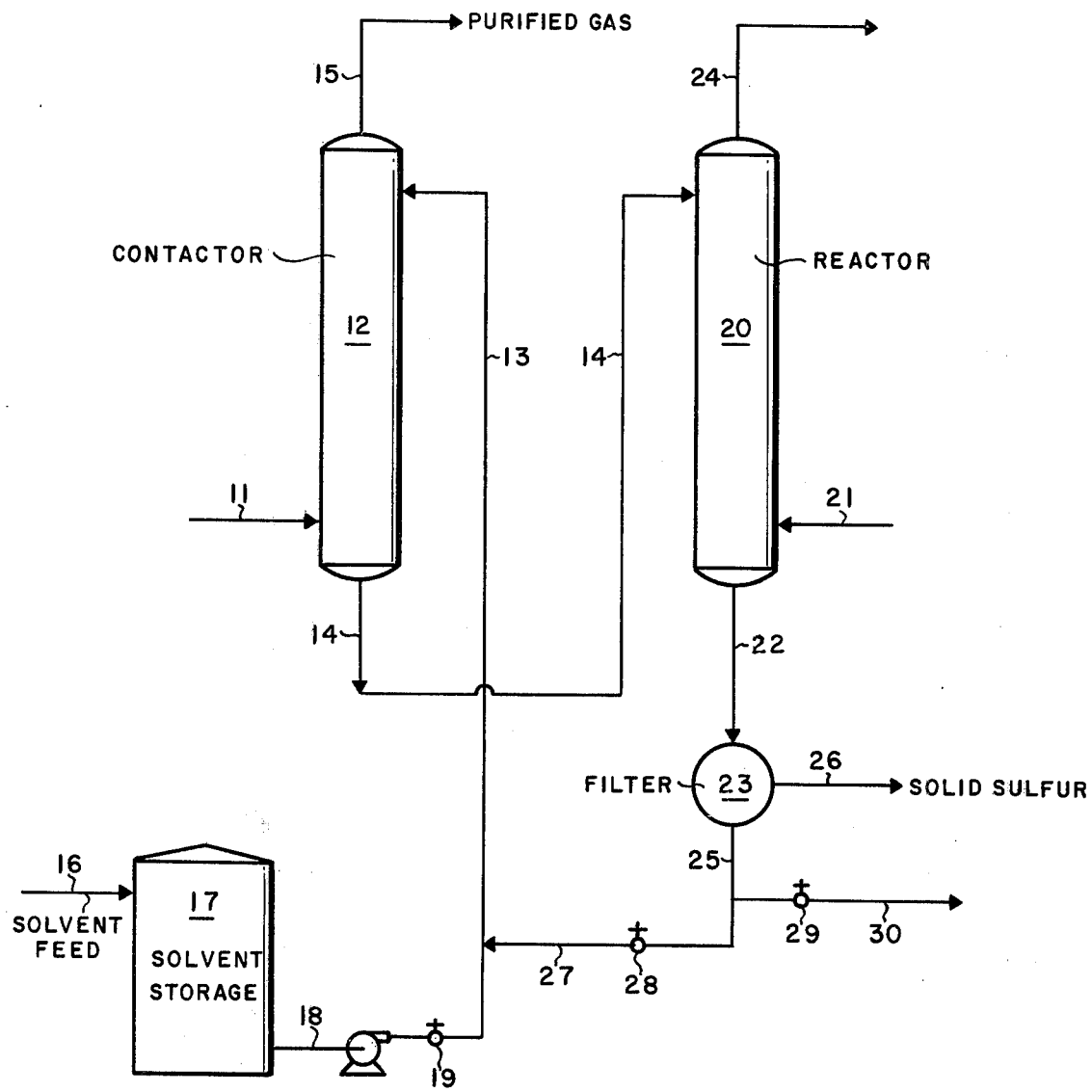

PROCESS FOR THE PRODUCTION OF SULFUR

CROSS REFERENCE TO RELATED APPLICATIONS

This application is a continuation-in-part of Serial No. 574,182, now abandoned filed in the United States Patent and Trademark Office on May 2, 1975.

BACKGROUND OF THE INVENTION

1. Field of the Invention

This invention relates to the production of sulfur and is particularly concerned with forming sulfur by reacting hydrogen sulfide with sulfur dioxide in the presence of liquid organic disulfides.

2. Description of the Prior Art

Hydrogen sulfide is a noxious gas which is frequently found in natural gas streams, in refinery and chemical plant process streams and in waste gas streams vented to the atmosphere from industrial sources. The hydrogen sulfide is normally removed from these streams in order to decrease corrosion in processing equipment, prevent fouling of catalysts and to comply with environmental emission standards. For economic reasons the recovered hydrogen sulfide is normally converted to elemental sulfur. The process most widely used for converting hydrogen sulfide to elemental sulfur is the Claus process.

In the Claus process a stream of hydrogen sulfide is fed into a reaction furnace where it is burned with sufficient air to convert one third of the hydrogen sulfide to sulfur dioxide. The hold-up time in the reaction furnace is such that the sulfur dioxide generated will partially react with the hydrogen sulfide to form sulfur vapor. The reaction takes place at about 2000° F. with no catalyst present. Approximately a 70% overall conversion of hydrogen sulfide to sulfur can be realized in this step. Next, the hot reaction gases are passed through a waste heat boiler and into a sulfur condenser where the sulfur produced in the thermal conversion step is removed. The gases are then reheated and injected into a catalytic converter where they are passed through a bed of catalyst, normally bauxite, to obtain further conversion of hydrogen sulfide to sulfur. The product gases are then passed through a condenser for removal of sulfur formed in the first converter. The gases from the condenser are then reheated and passed through a second catalytic converter to produce further sulfur. As many catalytic converters as desired can be used, however, experience has shown that two or three catalytic converters is usually the optimum choice.

A Claus conversion unit will generally yield about a 95% conversion of the hydrogen sulfide fed to the unit. This means that the tail gas from a Claus unit will normally contain sufficient residual sulfur compounds to violate emission control standards if it is vented to the atmosphere. It is therefore normally necessary to integrate a tail gas cleanup process with the Claus conversion plant.

The Claus process for converting hydrogen sulfide into sulfur has pronounced disadvantages. It may require a high capital investment, is expensive to operate, utilizes high temperatures, and results in only about a 95% conversion of hydrogen sulfide. The level of conversion obtained in a Claus unit may necessitate the addition of a tail gas treating process in order to meet emission regulations. Such a process may be complex and add substantially to the investment and operating costs of the sulfur recovery unit.

Several processes have been proposed to alleviate the problems associated with the Claus process. These processes normally consist of passing hydrogen sulfide and sulfur dioxide or gases containing these substances into a liquid organic solvent which preferentially absorbs the hydrogen sulfide and sulfur dioxide and serves as a medium for their reaction to form elemental sulfur. These processes differ somewhat in the manner and order in which the hydrogen sulfide and sulfur dioxide are passed into the solvent reaction medium, but the main factor that distinguishes these liquid phase processes from one another is the type of organic solvent that is used. For example, one process utilizes an aqueous solution of a glycol such as diethylene glycol, triethylene glycol, propylene glycol or the like as the solvent. Another process employs a carboxamide such as dimethylformamide, diethylformamide, diethylacetamide, or the like; while yet another process uses a sulfone such as sulfolane as the solvent.

Although the liquid phase solvent processes referred to above and similar processes for the production of sulfur have advantages over the Claus process in that they are simple, operate at low temperatures and result in higher conversions of hydrogen sulfide to elemental sulfur, they also have some pronounced disadvantages. The solvent utilized to absorb the reactant gases may be expensive, may not have a high absorptive capacity for both hydrogen sulfide and sulfur dioxide and may yield a flocculent or tacky sulfur which is difficult to recover by commercial methods of separation.

SUMMARY OF THE INVENTION

This invention provides an improved process for producing elemental sulfur from hydrogen sulfide and sulfur dioxide that alleviates many of the disadvantages encountered in the past. In accordance with the invention, it has now been found that liquid organic disulfides have a high capacity for absorbing both hydrogen sulfide and sulfur dioxide, and serve as an excellent reaction medium for the conversion of hydrogen sulfide to elemental sulfur by oxidation with sulfur dioxide. Hydrogen sulfide and sulfur dioxide are contacted with a liquid organic disulfide solvent in a reaction zone, the solvent and the sulfur produced by the reaction of absorbed hydrogen sulfide and sulfur dioxide are withdrawn from the reaction zone, and elemental sulfur is separated from the solvent. The disulfide solvent's excellent performance as a reaction medium is attributed to its high absorptive capacity for both hydrogen sulfide and sulfur dioxide. The absorptive quality of the disulfide solvent may be further utilized by integrating the sulfur production process with a gas treating or purification step. This may be accomplished by treating a gas containing either hydrogen sulfide or sulfur dioxide with the solvent before the other reactant is contacted with the solvent. After removal of the sulfur product from the disulfide solvent, the solvent may be reused in the gas treating step.

A mixture of liquid organic disulfides will normally be employed in carrying out the process but a pure disulfide may be used if desired. Suitable disulfides can be obtained relatively inexpensively by the oxidation of alkaline solutions obtained by treating gaseous or liquid mercaptan-containing hydrocarbon streams with a base. In addition to exhibiting a high capacity for absorbing hydrogen sulfide and sulfur dioxide, the organic disulfides show a high degree of selectivity for such materials in the presence of carbon dioxide and other gases.

The process of the invention has numerous advantages over previous methods for producing sulfur from hydrogen sulfide and sulfur dioxide which utilize liquid organic solvents as reaction media. The organic disulfides are inexpensive and easy to obtain, they have a high absorptive capacity for both hydrogen sulfide and sulfur dioxide, and yield solid sulfur which is easily separated from the solvent. The high absorptive capacity allows for the more efficient production of sulfur while using a smaller volume of solvent. Also, the absorptive qualities of the solvent allow the combination of the reaction step with a gas treating step to produce an efficient non-complex, inexpensive process for producing elemental sulfur while simultaneously purifying gas streams.

BRIEF DESCRIPTION OF THE DRAWING

The single FIGURE in the drawing is a schematic flow diagram of a process for the production of elemental sulfur from hydrogen sulfide and sulfur dioxide while simultaneously purifying a gas stream carried out in accordance with the invention.

DESCRIPTION OF THE PREFERRED EMBODIMENT

In the process depicted in the drawing, a feed gas stream which is to be purified by the removal of hydrogen sulfide or sulfur dioxide is introduced through line 11 into the contacting zone in an absorber or similar contacting vessel 12. The feed gas may be any natural or industrial process gas which contains hydrogen sulfide or sulfur dioxide. It may be a synthesis gas from which hydrogen sulfide is to be removed before the gas is further processed; it may be a flue or stack gas containing harmful sulfur dioxide which must be eliminated before the gas is vented to the atmosphere; it may be a refinery or chemical plant process gas stream containing hydrogen sulfide or sulfur dioxide; or it may be a sour stream of natural gas.

The feed gas is introduced into the bottom of contacting vessel 12 and moves upwardly through the contacting zone where it comes in contact with a downflowing stream of solvent introduced into the top of the vessel via line 13. If desired, the contacting zone may be provided with spray nozzles, perforated plates, bubble cap plates, packing or other means for promoting intimate contact between the gas and liquid. As the feed gas rises through the contacting zone, the sulfur dioxide or hydrogen sulfide initially present in the feed gas is absorbed in the solvent which then exits the vessel through line 14. The purified gas is removed from the vessel through line 15 and may then be either vented to the atmosphere or transferred to downstream units for further processing.

The solvent used to absorb the gaseous impurities from the feed gas is composed of liquid organic disulfides. It has been found that these organic disulfides not only have a high capacity for absorbing both sulfur dioxide and hydrogen sulfide while at the same time exhibiting a low affinity for nitrogen, air, steam, carbon dioxide, carbon monoxide, hydrogen, methane, ethane, propane, ethylene, and the like, but also serve as an excellent reaction medium for the conversion of hydrogen sulfide to elemental sulfur by oxidation with sulfur dioxide. These two properties of the organic disulfide solvent enable it to form the basis of an efficient, integrated process for purifying a gas stream containing sulfur dioxide or hydrogen sulfide while simultaneously producing elemental sulfur.

The solvent will normally be a mixture of liquid organic disulfides but a pure disulfide may be used if available in the required quantities. The individual compounds making up the solvent have the generalized formula $R_1 - S - S - R_2$, where $R_1$ and $R_2$ may be the same or different and may be, for example, (1) straight or branched chain aliphatic groups having from 1 to about 15 carbon atoms, such as methyl, ethyl, butyl, isobutyl, hexyl, isooctyl, isooctenyl, and dodecyl radicals; (2) cycloaliphatic groups having from 3 to about 20 carbon atoms, such as cyclopropyl, methyl cyclobutyl, cyclohexenyl, butyl cyclohexyl and octyl perhydronaphthyl radicals; (3) aryl groups having from 6 to about 42 carbon atoms, such as phenyl, benzyl, tolyl, xylyl, naphthyl, naphthylmethylene, dioctylphenyl, indenyl, and didodecylphenyl radicals; and (4) mixed radicals derived from natural or synthetic materials such as tallow, coconut oil, soybean oil and oxo alcohols.

Specific examples of disulfides which may be present in the solvent, alone or in combination with other compounds, include methyl hexyl disulfide, diisopropyl disulfide, methyl ethylene disulfide, dipropylene disulfide, ethylene nonene disulfide, dipropyne disulfide, methyl heptyne disulfide, dicyclohexane disulfide, ethyl cyclopentane disulfide, dicyclohexene disulfide, cyclopropane cyclopentene disulfide, diphenyl disulfide, ethyl phenyl disulfide, dinaphthyl disulfide, phenyl naphthyl disulfide, ditolyl disulfide, distyryl disulfide, propene mesityl disulfide, and the like.

Because of the reactivity of double and triple bonds, there may be a tendency for these bonds to interact with the hydrogen sulfide or sulfur dioxide. It is therefore preferred that $R_1$ and $R_2$ be radicals containing no unsaturated bonds except for those bonds found in the aromatic portion of the radicals, such as: (1) straight and branched chain alkyl radicals having from 1 to about 15 carbon atoms; (2) cycloalkyl radicals having from 3 to about 20 carbon atoms, such as cyclopropyl, cyclopentyl and cyclohexyl radicals; and (3) aryl radicals having from 6 to about 42 carbon atoms, such as

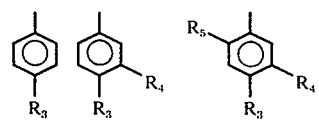

where $R_3$, $R_4$ and $R_5$ are straight and branched chain alkyl groups containing from 1 to 12 carbon atoms and

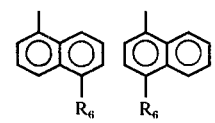

where $R_6$ is a straight or branched chain alkyl group containing from 1 to 12 carbon atoms.

As can be seen from the above, the solvent may be a mixture of many diverse types of disulfides such as dialkyl disulfides, dicycloalkyl disulfides, diaryl disulfides, alkyl cycloalkyl disulfides, alkyl aryl disulfides and cycloalkyl aryl disulfides, among others. Excellent results have been obtained, for example, with a solvent composed of 86% diaryl disulfides and 14% alkyl aryl disulfides, the predominant species being ditolyl disulfide. A solvent composed primarily of a mixture of diaryl disulfides containing from 12 to 30 carbon atoms per molecule is generally preferred.

Satisfactory solvents containing mixed liquid organic disulfides can be prepared by the oxidation of mercaptans with a variety of mild oxidizing agents, such as sulfuric acid or atmospheric oxygen. A convenient and inexpensive source of organic disulfides is the product obtained by air blowing alkaline solutions produced by the treatment of mercaptan-containing liquid and gaseous hydrocarbons with a base, a process which has been described in the patent literature and will therefore be familiar to those skilled in the art. Such alkaline solutions are frequently produced when high sulfur crude oils are refined. Many refinery process streams contain mercaptans which must be removed before the streams can be further processed. The mercaptans are partially removed by treating the streams with an alkaline wash, such as a solution of sodium hydroxide. The alkaline wash solution extracts the mercaptans in the form of alkali salts or mercaptides. By air blowing the spent alkaline solution, the mercaptides are oxidized and form an insoluble layer of organic disulfides which can be readily recovered and used as a gas treating solvent. The actual disulfide composition of the solvent thus produced will depend somewhat upon the distribution and types of mercaptans found in the refinery streams treated with the alkaline wash, which will in turn vary from refinery to refinery and will depend in part upon the type of crude oil being refined. A chemical analysis of an organic disulfide solvent obtained by air blowing a composite wash solution formed by combining spent alkaline solutions produced in several different refineries around the country is set forth in Table I below. The analysis is believed to be representative of the solvent obtained by air blowing typical spent alkaline solutions.

TABLE I

| Composition of Disulfide Solvent Produced by Air Blowing Spent Alkaline Solution | |
|---|---|
| Compound | Wt. % of Disulfide* |
| Methyl Phenyl Disulfide | 0.44 |
| Methyl Tolyl Disulfide | 2.97 |
| Ethyl Tolyl Disulfide | 5.25 |
| Propyl Tolyl Disulfide | 3.36 |
| Higher Boiling Alkyl Aryl Disulfides | 2.09 |
| Diphenyl Disulfide | 2.42 |
| Phenyl Tolyl Disulfide | 13.11 |
| Ditolyl Disulfide | 41.82 |
| Higher Boiling Diaryl Disulfides | 28.54 |
| | 100.0 |

*Along with the disulfides, the fresh solvent may also contain small amounts of unreacted mercaptans and other organic compounds but these will not seriously affect the solvent's performance.

In the process depicted in the drawing the solvent, preferably one produced by air blowing an alkaline solution as discussed above, is passed via line 16 into storage tank 17. The solvent is then pumped from the storage tank through line 18, valve 19 and line 13 into contacting vessel 12 as needed.

The contacting vessel employed in the process may be any type of liquid-gas contacting vessel such as an absorption column or the like. The absorption process may be carried out at any desired pressure. The actual pressure utilized may depend on the source of the feed gas. For example, if the feed gas is a sour natural gas from a high pressure gas well, it may be desirable to operate the contactor at high pressures, pressures ranging from about 500 to about 3000 pounds per square inch or more, depending on the wellhead pressure. If, on the other hand, the feed gas is a stack gas, it may be desirable to carry out the absorption step at about atmospheric pressure. The temperature should normally be maintained somewhat below the solvent's initial boiling point at the operating pressure. Depending on the temperature of the feed gas, it may be advisable either to cool or heat the solvent or feed gas before it is injected into the contacting vessel.

It is normally preferred that the flow rate of the solvent fed to contacting vessel 12 be adjusted such that substantially all of the hydrogen sulfide or sulfur dioxide in the feed gas is absorbed and the gas exiting in line 15 is substantially free of any sulfur-containing contaminants. The solvent exiting the contacting vessel is passed through line 14 to reactor or similar vessel 20.

In the reactor the disulfide solvent is utilized as a reaction medium in which hydrogen sulfide and sulfur dioxide react to form sulfur according to the following equation: $2H_2S + SO_2 \rightarrow 3S + 2H_2O$. One of the reactants in the above equation will have been absorbed from the gas fed to contacting vessel 12 and will be present in the solvent entering reactor 20 via line 14. The other reactant is injected into the bottom of reactor 20 through line 21 and is passed upwardly through the downflowing solvent. If the feed gas to contacting vessel 12 contains hydrogen sulfide, then the gas injected into the reactor via line 21 will be sulfur dioxide or a sulfur dioxide-containing gas. Conversely, if the feed contains sulfur dioxide, the injected gas will be hydrogen sulfide or a hydrogen sulfide-containing gas.

The organic disulfide solvent, whose composition was described in detail above, has a high capacity for absorbing both hydrogen sulfide and sulfur dioxide and serves as an excellent and superior reaction medium for the oxidation of hydrogen sulfide by sulfur dioxide to form elemental sulfur. Most solvents used in the past as reaction media are inferior because they either have a high absorptive capacity for hydrogen sulfide or sulfur dioxide but not for both.

If the gaseous reactant injected through line 21 into the reactor is in a mixture of gases, the other gases should be insoluble or only slightly soluble in the solvent. The disulfide solvent has a very low affinity for nitrogen, air, steam, carbon dioxide, carbon monoxide, hydrogen, methane, ethane, propane, ethylene, and the like. These gases, therefore, will pass through the solvent into line 24 and may either be vented to the atmosphere or transferred to downstream units for further processing. The solvent has a high affinity for most sulfur and nitrogen-containing compounds and it may be advisable to avoid injection of sulfur oxides other than sulfur dioxide, nitrogen oxides and similar substances into the reactor.

The reactor employed in the process may be any type of liquid-gas contacting vessel containing sufficient internals to effect fairly good contact between the down-flowing solvent and rising gas but not so designed as to be easily fouled by particulate sulfur. The reaction may be carried out at any desired pressure. The temperature should normally be maintained somewhat below the solvent's initial boiling point at the operating pressure. It may be advantageous, if possible, to operate the reactor at approximately the same conditions as contacting vessel 12. It may be desirable to carry out the reaction at a temperature sufficiently below the melting point of sulfur so that the sulfur formed is in a solid form which is easily separated from the solvent reaction medium.

The solvent reaction medium and the sulfur formed in the reactor are withdrawn from the reactor via line 22 and passed to rotary filter or similar device 23 where the particles of sulfur are removed as produce via line 26. The solvent, substantially depleted in elemental sulfur, is withdrawn from the filter through line 25. Since the solvent gives up both absorbed hydrogen sulfide and sulfur dioxide to supply the sulfur-forming reaction taking place in the reactor, the solvent exiting rotary filter 23 is substantially free of those substances and may be reused as a gas treating agent by returning it to contacting vessel 12 via line 27, valve 28 and line 13.

If the sulfur-forming reaction is carried out at a temperature above the melting point of sulfur, the effluent from the reactor will be composed of two liquid phases. In such a case the product sulfur may be recovered by allowing the liquid phases to separate in a settling zone and removing the liquid sulfur. The solvent may then be returned to the contactor.

Sutdies indicate that some mercaptans and elemental sulfur are produced when a disulfide solvent is contacted over extended periods with gas containing hydrogen sulfide. Apparently this phenomenon is the result of an interaction between the disulfide molecules of the solvent and the hydrogen sulfide molecules. It is theorized that the disulfide molecules are reduced to their corresponding mercaptans by hydrogen sulfide which is itself oxidized to elemental sulfur in accordance with the following equation:

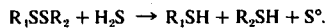

$$R_1SSR_2 + H_2S \rightarrow R_1SH + R_2SH + S°.$$

If the concentration of mercaptans due to the above-described phenomenon becomes excessive, it may be advantageous to regenerate the solvent by converting the mercaptans back to disulfides. This may be accomplished by passing the filtered solvent from line 25 into line 30 and through valve 29 to a regenerator or similar vessel, not shown in the drawing, where the solvent is contacted with an oxidizing agent in the presence of a base. This procedure results in the conversion of the mercaptans in the solvent to salts or mercaptides which are oxidized to form reconstitued disulfides. The reconstituted disulfides may then be returned to solvent storage tank 17 or contactor 12.

The disulfide solvent may have a tendency to lose its effectiveness both as an absorbent and a reaction medium after it has made numerous trips through the process flow scheme depicted in the drawing. When this occurs it becomes desirable to replace the spent solvent with fresh solvent. This may be accomplished by closing valve 28 and passing the filtered solvent through line 30 and valve 29 to a hydrotreater, not shown in the drawing, where the spent solvent may be conventionally hydrotreated and converted to useful hydrocarbons and hydrogen sulfide. The spent solvent is then replaced by fresh solvent which is pumped from storage tank 17 through line 18, valve 19, and line 13 into contacting vessel 12.

It will be understood, of course, that the process of the invention is not limited to the embodiment shown and described above. The invention encompasses any process in which hydrogen sulfide is reacted with sulfur dioxide to form elemental sulfur in the presence of a liquid organic disulfide reaction medium. For example, one possible alternative embodiment is the simultaneous injection of gaseous hydrogen sulfide and gaseous sulfur dioxide into a reaction zone containing an organic disulfide solvent. Another possible embodiment is the combination of sulfur production with the simultaneous purification of a hydrogen sulfide-containing gas and a sulfur dioxide-containing gas. This may be accomplished as follows. A hydrogen sulfide-containing gas is treated with a disulfide solvent in a first contacting zone while a sulfur dioxide-containing gas is treated with another portion of the same disulfide solvent in a second contacting zone. The disulfide solvent effluent from each contacting zone is then combined in a reaction zone where the absorbed hydrogen sulfide reacts with the absorbed sulfur dioxide to form elemental sulfur.

It will be apparent from the preceding discussion that the invention provides an improved process for producing elemental sulfur which is more effective, less expensive and more versatile than most processes proposed or used in the past.

I claim:
1. A process for producing elemental sulfur comprising:
   a. reacting hydrogen sulfide with sulfur dioxide in the presence of a liquid organic solvent in a reaction zone, said solvent comprising at least one compound of the formula $R_1 - S - S - R_2$ wherein $R_1$ and $R_2$ are selected from the group consisting of straight and branched chain aliphatic radicals having from 1 to about 15 carbon atoms, cycloaliphatic radicals having from 3 to about 20 carbon atoms, and aryl radicals having from 6 to about 42 carbon atoms; and
   b. separating elemental sulfur from said solvent.
2. A process as defined in claim 1 wherein $R_1$ and $R_2$ are straight and branched chain alkyl radicals having from 1 to about 15 carbon atoms.
3. A process as defined in claim 1 wherein $R_1$ and $R_2$ are cycloalkyl radicals having from 3 to about 20 carbon atoms.
4. A process as defined in claim 1 wherein said solvent comprises a mixture of diaryl and alkyl aryl disulfides.
5. A process as defined in claim 1 wherein said solvent comprises a mixture of diaryl disulfides.
6. A process as defined in claim 5 wherein said diaryl disulfides contain from about 12 to about 30 carbon atoms per molecule.
7. A process as defined in claim 1 wherein said solvent comprises ditolyl disulfide.
8. A process for producing elemental sulfur comprising:
   a. reacting hydrogen sulfide with sulfur dioxide in the presence of a liquid organic solvent in a reaction zone, said solvent comprising a mixture of organic disulfides obtained by air blowing an alkaline solution produced by the treatment of mercaptan-containing hydrocarbons with a base; and
   b. separating elemental sulfur from said solvent.

* * * * *